UNITED STATES PATENT OFFICE.

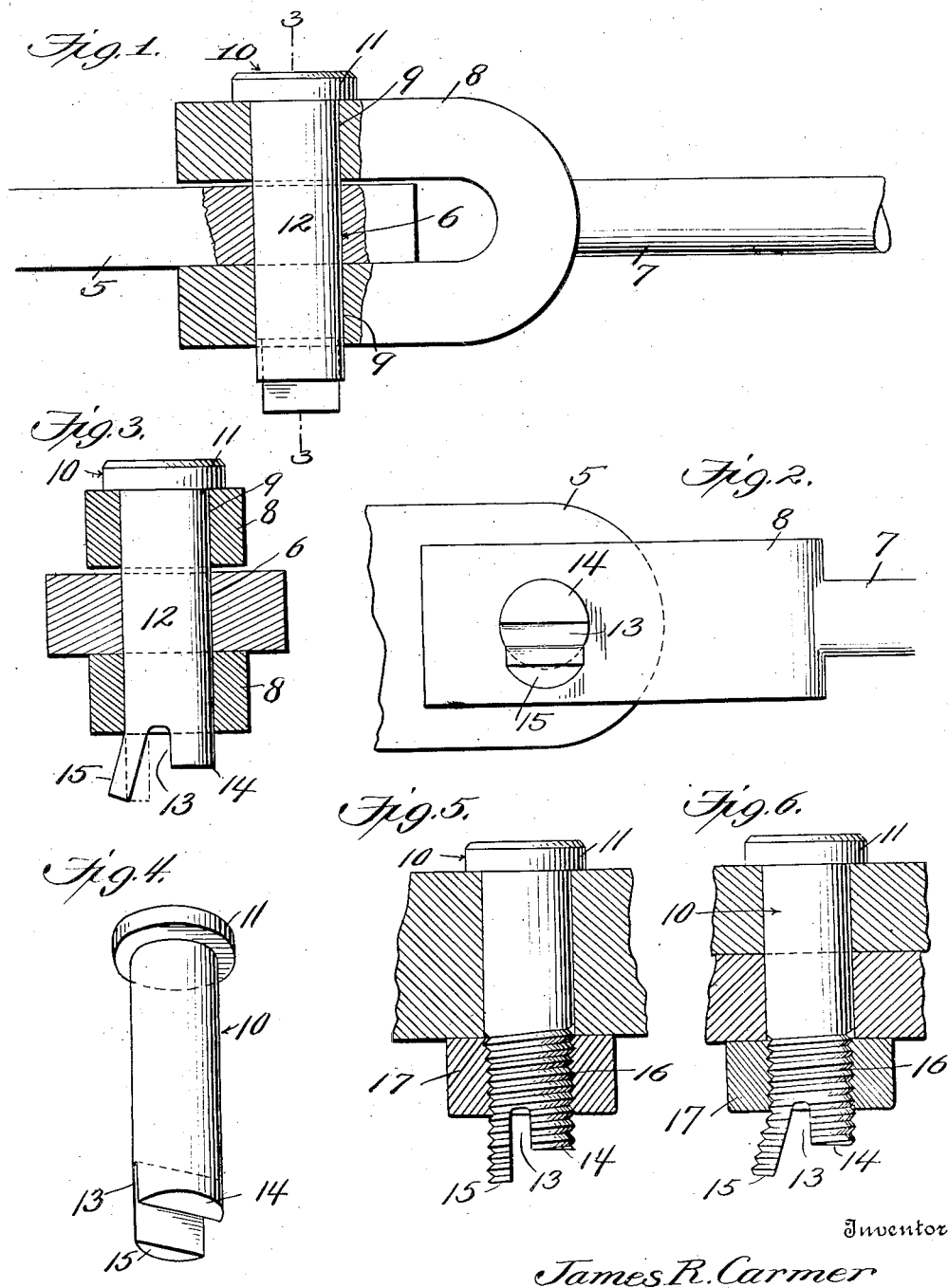

JAMES R. CARMER, OF WILMINGTON, DELAWARE.

PIN OR BOLT.

1,354,953.

Specification of Letters Patent.

Patented Oct. 5, 1920.

Application filed April 2, 1920. Serial No. 370,784.

*To all whom it may concern:*

Be it known that I, JAMES R. CARMER, a citizen of the United States, residing at Wilmington, in the county of New Castle and State of Delaware, have invented new and useful Improvements in Pins or Bolts, of which the following is a specification.

This invention relates to a coupling or securing pin or bolt, and the primary object of this improved pin is to provide means as a part of the pin or bolt for securing the latter against movement or accidental displacement relatively to a part or parts with which it may be operatively associated and to obviate the use of a cotter or other supplemental securing device separably inserted through or otherwise applied to a pin or bolt as an auxiliary securing means. The improved pin may be either smooth and used without a nut or washer, or it may be threaded and have a nut applied thereto. The improved pin or bolt is adapted for general application, but is particularly advantageous in its service in coupling levers or other movable devices, and is especially intended as a means for coupling brake-rod levers. Among other advantages of the improved pin or bolt is the durability thereof due to minimized wear, and as a consequence an economy in use results as well as more effectiveness in performing the function of a coupling or securing means.

The invention consists in the preferred construction and arrangement of the parts of the pin which will be more fully hereinafter described and claimed.

In the drawings:

Figure 1 illustrates the coupled ends of brake-rods in sectional elevation and showing the improved pin inserted therethrough.

Fig. 2 is a plan view of the parts shown by Fig. 1 and showing the special arrangement of the pin or bolt terminal for securing the parts to which the pin or bolt is applied.

Fig. 3 is a transverse vertical section taken on the line 3—3 of Fig. 1.

Fig. 4 is a detail perspective view of the improved pin or bolt.

Figs. 5 and 6 are sectional views showing the improved pin or bolt threaded to receive a nut, the respective figures showing the nut in unsecured and secured relation to the pin or bolt.

It will be understood that the application of the improved pin or bolt to the coupled ends of a brake-rod is but one advantageous use of the improved pin or bolt and that it is proposed to apply the improved device to any structure to which it may be applicable. As an illustration of one application of the improved device the numeral 5 designates one coupling extremity of a brake-rod or analogous member having an opening 6 therethrough, and 7 designates the opposing coupling extremity of a brake-rod or other device provided with a jaw 8 having alined openings 9 extending through the members thereof and with which the opening 6 of the extremity 5 of the coöperating brake-rod member alines for the purpose of inserting therethrough the improved pin or bolt 10, which may be of any suitable dimensions and has a flanged head 11. The pin or bolt, as shown by Figs. 1, 2, 3 and 4, has a smooth shank 12, and eccentrically formed in the free end thereof is a longitudinal slot 13 to provide opposed terminals 14 and 15 of varying thicknesses, the terminal 15 being of materially less thickness than the terminal 14 and also longer than the latter terminal. The longer bent terminal or member 15 provides readily engageable means for locking the pin or bolt in accidental inseparable relation to the parts with which the pin or bolt engages, and also effectively secures the parts in assembled relation, the said terminal or member 15 being easily engaged to bend the same by making the terminal or member 14 of less length than the said terminal 15. The bend of the terminal or member 15 is affected and induced by the angular edge of the part or device which it secures in place or in association with some other part or parts, and the slot 13 is of such length as to facilitate the bending operation of the terminal or member 15. The shorter thicker terminal 14 is rigid or unbendable and is always maintained in its normal straight construction.

Instead of having the shank 12 of the bolt smooth throughout its entire length it may be formed with threads 16, the threads being continued regularly over the terminals or members 14 and 15 to receive a nut 17, the terminal or member 15 being bent after the nut is in place, as shown by Fig. 6, to thereby securely obstruct loosening or accidental disengagement of the nut from the threaded extremity of the pin or bolt.

From the foregoing the operation of the improved pin or bolt will be readily understood. After the said pin or bolt in either of its forms has been applied the reduced elongated terminal or member 15 is struck laterally by means of a hammer or other tool to secure the pin or bolt in place, or to prevent accidental disengagement thereof of the nut that may be applied thereover. The improved pin or key-bolt may be readily applied and secured without the use of special tools, and, as hereinbefore indicated, the use of keys or cotter pins is avoided. The elongated bendable terminal or member 15 of the pin or bolt has considerable breadth and thereby presents a more extended surface which will reduce wear to a minimum and after the pin or bolt is secured it will have a certain amount of looseness in the brake-lever or other device 5 to which it is applied and thus relieve the bent extremity or terminal 15 from extraordinary wear. The improved pin or bolt can be readily manufactured in a comparatively simple manner and is provided in itself with means for securing it either against coupled jaws or other elements, or against a nut, and thereby overcomes frequent inconvenience arising from the necessity of supplying supplemental securing devices both in the application and withdrawal of the latter. The improved pin or bolt is also more positive and advantageous in the performance of its function. The slot 13 is of such length relatively to the pin or bolt, that when the extremity or terminal 15 is bent the inner terminal wall of the slot will be at a distance inwardly from adjacent surfaces of the parts coupled so as to effect a tight jointure of the pin or bolt when the extremity 15 is bent outwardly.

In withdrawing the improved pin or bolt from secured position it is only necessary in either form to strike the bent terminal or member back into normal position, when it may be withdrawn from the devices with which it has been used as a coupling means, or if it be of screw-threaded form the nut thereon may then be readily removed. The head 11 of the bolt or pin may also be varied in its contour and is not confined to the flat type of head shown in the drawing. The bolt shank is also shown as circular in cross section, but in some instances it may be desired to change the shape of the shank and preserve the improved features therein. This obvious change is also contemplated and will not in the least affect the practicability of the means embodied within the bolt structure for securing the same.

What is claimed as new is:

1. A fastening device of the class specified, comprising a straight shank having one end longitudinally slotted to provide continuously spaced terminals, the one terminal being longer and thinner than the remaining terminal and bendable laterally with relation to the shorter thicker terminal, the shorter thicker terminal being rigid and unbendable.

2. A fastening device of the class specified, comprising a shank having one extremity longitudinally and eccentrically slotted to provide continuously spaced terminals, one of the terminals being longer and thinner than the other and bendable laterally relatively to the thicker terminal, the shorter thicker terminal being rigid and unbendable.

In testimony whereof I have hereunto set my hand in presence of two subscribing witnesses.

JAMES R. CARMER.

Witnesses:
GEORGE C. HEISER,
BARNET GLUCKMAN.